(12) United States Patent
McAllister, Jr. et al.

(10) Patent No.: US 7,736,726 B2
(45) Date of Patent: Jun. 15, 2010

(54) POLYMERIC FILM WITH LOW BLOCKING AND HIGH SLIP PROPERTIES

(75) Inventors: Larry B McAllister, Jr., Spartanburg, SC (US); Dwight W. Schwark, Simpsonville, SC (US); Larry W. Boyter, Duncan, SC (US); Blaine C. Childress, Inman, SC (US)

(73) Assignee: Cryovac, Inc., Duncan, SC (US)

( * ) Notice: Subject to any disclaimer, the term of this patent is extended or adjusted under 35 U.S.C. 154(b) by 611 days.

(21) Appl. No.: 10/648,027

(22) Filed: Aug. 26, 2003

(65) Prior Publication Data

US 2004/0115453 A1 Jun. 17, 2004

Related U.S. Application Data

(60) Provisional application No. 60/434,152, filed on Dec. 17, 2002, provisional application No. 60/487,172, filed on Jul. 14, 2003.

(51) Int. Cl.
*B32B 7/02* (2006.01)
*B32B 27/08* (2006.01)

(52) U.S. Cl. ....................... 428/212; 428/516
(58) Field of Classification Search ................. 428/516, 428/212
See application file for complete search history.

(56) References Cited

U.S. PATENT DOCUMENTS

| | | | |
|---|---|---|---|
| 2,160,945 A | 6/1939 | Wiley | |
| 3,645,822 A | 2/1972 | VVidiger et al. | |
| 4,194,029 A | 3/1980 | Lam | |
| 4,194,039 A | 3/1980 | Mueller | |
| 4,303,571 A | 12/1981 | Jansen et al. | |
| 4,325,850 A | 4/1982 | Mueller | |
| 4,514,465 A * | 4/1985 | Schoenberg | 428/339 |
| 4,532,189 A | 7/1985 | Mueller | |
| 4,777,081 A * | 10/1988 | Crass et al. | 428/215 |
| 5,443,765 A | 8/1995 | Yoshimura et al. | |
| 5,472,791 A | 12/1995 | Landoni | |
| 5,851,610 A | 12/1998 | Ristey et al. | |
| 6,045,882 A | 4/2000 | Sandford | |
| 6,197,244 B1 | 3/2001 | Buongiorno et al. | |
| 6,210,764 B1 * | 4/2001 | Hayes | 428/34.9 |
| 6,291,038 B1 | 9/2001 | Babrowicz | |
| 6,291,063 B1 | 9/2001 | Shah et al. | |
| 6,299,984 B1 | 10/2001 | Forloni | |
| 6,423,421 B1 | 7/2002 | Banaszak et al. | |
| 6,497,965 B1 * | 12/2002 | Longmoore et al. | 428/515 |
| 6,524,720 B1 * | 2/2003 | Shah | 428/516 |
| 6,592,975 B1 | 7/2003 | Ueyama et al. | |
| 6,706,389 B1 | 3/2004 | Bates et al. | |
| 6,846,863 B2 * | 1/2005 | Plume et al. | 524/211 |
| 2002/0150735 A1 | 10/2002 | Nozawa et al. | |
| 2006/0046048 A1 | 3/2006 | Kapur et al. | |

FOREIGN PATENT DOCUMENTS

| | | |
|---|---|---|
| DE | 42 22 832 A1 | 1/1994 |
| EP | 0 444 917 A2 | 9/1991 |
| GB | 2 246 741 A | 2/1992 |
| JP | 10168252 A | 6/1998 |
| JP | 11269328 A | 10/1999 |
| WO | WO 99/00250 | 1/1999 |
| WO | WO 99/33657 | 7/1999 |
| WO | 2004/072176 | 8/2004 |

OTHER PUBLICATIONS

"Amides & Stearates", Oct. 2001, 8 pages.
Crompton: "Olefins & Styrenics", May 23, 2003, 1 page.
J. Drasner & Co., Inc., "Chemical Additives", Jun. 24, 2004, 2 pages.
Anonymous: "History and diversity of waxes", Jun. 25, 2004, 7 pages.

* cited by examiner

*Primary Examiner*—Sheeba Ahmed
(74) *Attorney, Agent, or Firm*—Mark B. Quatt

(57) ABSTRACT

A film includes first and second outer layers, a core layer, and first and second substrate layers, each layer including a polymer; at least one of the substrate layers includes an amidic wax, and at least one of the outer layers includes an amidic wax present in an amount of 1% to 50% of the amount of wax in the first and second substrate layers respectively. The wax can be blended with a transition metal salt of stearic acid, or ester of stearic acid. Alternatively, a film includes first and second outer layers, and a substrate layer, each layer including a polymer; at least one of the first outer layer, second outer layer, and substrate layer including a blend of an amidic wax, and a transition metal salt of stearic acid, or ester of stearic acid.

16 Claims, 1 Drawing Sheet

POLYMERIC FILM WITH LOW BLOCKING AND HIGH SLIP PROPERTIES

This application claims the benefit of U.S. Provisional Application No. 60/434,152, filed Dec. 17, 2002, and of U.S. Provisional Application No. 60/487,172 filed Jul. 14, 2003.

FIELD OF THE INVENTION

The invention relates to a polymeric film with low blocking and high slip properties for use in packaging applications.

BACKGROUND OF THE INVENTION

Amide waxes have been used for many years as slip agents in the production of films. Chemically, the waxes are primary, secondary, tertiary, or bis fatty amides, such as oleamide and erucamide.

Amidic waxes are generally immiscible with the host polymer with which they are typically associated via an extrusion process. Host polymers typically include polypropylene, ethylene/alpha olefin copolymer, ethylene/vinyl acetate copolymer (EVA) or other ethylene copolymers such as ionomer resin, ethylene/acrylic or methacrylic acid copolymer, ethylene/acrylate or methacrylate copolymer; or low density polyethylene (LDPE).

Producers of polymeric film operate on the principle that the wax molecule is of a lower molecular weight than the host polymer, and therefore generally more mobile than the host polymer. When the host polymer is in a molten state (during extrusion), waxes can migrate more freely through the host polymer. Waxes migrate through a host polymer in solid state as well, but at a much slower rate. This wax migration, and the polar amide component of the wax molecule, leads to the phenomenon that the wax will diffuse to the surface of the polymeric film. The diffusion rate for surface migration is the "bloom rate". The bloom rate is influenced not only by the relative molecular weights of the wax and host polymer, but also by the level of saturation of the wax hydrocarbon chain, the polarity of the host polymer, and the architecture of the secondary, tertiary, and bis fatty amide molecules.

Producers of polymeric film also operate on a second principle that packaging applications typically require a film with a low coefficient of friction (COF). This requirement is dictated by the need for the film to run properly on packaging equipment used by food processors and other packagers. For example, in the case of Vertical Form Fill Seal (VFFS) equipment, typical film requirements are a film-to-film COF of less than 0.3. Low molecular weight amidic waxes require sufficient time to "bloom" to the surface before a low COF is achieved in the final film. The resin choice for the surface layer of a VFFS film must have sufficient heat seal properties. Thus, sealant layers typically include those resins mentioned above, such as LLDPE, metallocene catalyzed polymers, and EVA polymers. These materials are much tackier than polypropylene (PP) or propylene/ethylene copolymer (EPC), and present a challenge for the development of adequate film surface properties such as COF or slip.

To help reduce this surface tackiness or tendency for the polymeric film to stick to itself or block, antiblock agents are typically utilized in the surface layer. Typical particulate antiblock agents include various silicas, carbonates, synthetic particulates, etc. Other types of antiblock agents include amidic waxes themselves such as the bis fatty amides. While such antiblock agents can reduce tackiness, they may not yield a high slip polymeric film.

For some packaging applications, the polymeric film is extruded in annular form, one or both edges of the film are slit, and the planar film is either wound or centerfolded in a manner well known in the art. A cylindrical forming piece is used to cast the molten polymer into an initial film thickness and diameter in the shape of a tube. The molten polymer is quenched to solid state by a water bath or spray, as it travels over the forming cylinder, into a continuous length of precursor film tubing.

A problem encountered in this process is that at the extrusion die, a significant amount of wax migrates to the surface of the just emerging tubing as the precursor film contacts film making equipment located downstream of the extrusion die. If wax has been added to the host polymer in the extrusion process at a level to provide the adequate (low enough) COF and adequate (high enough) slip properties needed in the final heat shrinkable film, the equipment becomes covered in wax over time. Such waxy deposits eventually break off in solid form or transfer to the tube in liquid form, resulting in aesthetic anomalies in the final film. Although aesthetic or cosmetic anomalies in the film are sufficient by themselves to affect the commercial viability of the film, at some level of contamination, the physical properties of the film can be compromised as well. Thus, frequent cleaning of the film making equipment may be required, resulting in undesirable downtime. Film end use governs the frequency of the cleaning interval, thereby limiting continuous extrusion to relative short periods of time, and increasing the cost of film production.

A second problem associated with the production of many polymeric films intended for packaging applications is that after the precursor film forming step described above, additional orientation steps are completed and a resulting heat shrinkable film is typically wound up in roll form. Amidic waxes such as erucamide often require a minimum of 24 hours to approach a sufficient equilibrium concentration on the film's outer surface (i.e. often require a minimum of 24 hours to bloom to the film's outer surface) to permit adequate processing on packaging equipment. When polymeric films are made, especially heat shrinkable films, the film is rolled up such that the bottom (that is, the interior winds near the film core) of a film roll can be under a relatively high tension of several hundred pounds per square inch. This roll pressure has been found to retard or even prevent significant wax from blooming to the film surface after the film is wound into roll form. Additionally, a film roll which is wound under high pressure may result in wax diffusion through several film layers thereby depleting wax concentration in some regions of the roll and buildup in other regions. Wax migration in the roll undermines desired consistent film performance from the beginning to the end of the roll. Consequently, the level of wax on the film surface has been shown to be greater on the top of the roll (i.e. the exterior winds of the roll) where roll pressure is less, than it is at the end of a roll nearest the metal, paper or plastic roll core member. This significantly affects the ultimate performance of the film, especially with respect to the manner in which the film runs or "tracks" on high-speed packaging equipment. Additionally, in some cases only portions of a roll of film may be utilized on packaging equipment, and the rest has undesirably "blocked", i.e. bonded together at film surfaces on the roll, resulting in significant roll footage waste.

Applicants have found that a solution to the above-mentioned first problem (the build up of wax during the film making process) is to dispose one or more amidic waxes in an inner layer of a multi-layer film. This solution results in either no amidic wax present in the surface layers of the multi-layer film, or else significantly less wax present in the surface layers than in one or more inner substrate layers during the initial stages of film formation.

Applicants have found that a solution to the second above-mentioned problem (the differential level of surface wax within the rolled film) is to include a transition metal salt of stearic acid, or an ester of stearic acid, in the inner substrate layer or layers, and/or the surface layers of the film. Applicants have found that a transition metal salt of stearic acid, or an ester of stearic acid, acts as a facilitator to cause the wax to bloom more quickly to the surface of the film. Such accelerated bloom provides a multi-layer film with desired surface properties. Thus, wax in an inner substrate layer diffuses to the film's outer surfaces before the film is wound onto a roll, thereby providing adequate slip prior to the pressures encountered during winding of the film onto a core member. Such controlled bloom time can reduce the need for above-mentioned wax migration within a film roll and result in more uniform levels of wax at the film surface throughout a roll length.

The two solutions in suitable combination provide a polymeric multi-layer film, such as a heat shrinkable film, having good slip (i.e. low COF) properties, while eliminating significant wax build-up on film-making machine components. The ability to control wax migration reduces manufacturing waste and provides improved performance by ensuring consistency throughout rolls of polymeric films.

Definitions

"Polymeric film" herein means a thermoplastic polymeric film, laminate, sheet, web, or the like, which can be used to package an article. The film can be used alone, or as a component in a rigid, semi-rigid, or flexible product, and can be adhered to a non-polymeric or non-thermoplastic substrate such as paper or metal.

"Polymer" and the like herein means a homopolymer, but also copolymers thereof, including bispolymers, terpolymers, etc. Polymers that may be used to formulate outer, substrate, or core film layers include, by way of example, any resin typically used in films for packaging applications, such as the following polymers, their copolymers, or blends: polyolefin, polyethylene, ethylene/alpha olefin copolymer, ethylene/vinyl acetate copolymer; ionomer resin; ethylene/acrylic or methacrylic acid copolymer; ethylene/acrylate or methacrylate copolymer; low density polyethylene, polypropylene, polystyrene, polycarbonate, polyamide (nylon), acrylic polymer, polyurethane, polyvinyl chloride, polyvinylidene chloride, polyester, ethylene/styrene copolymer, norbornene/ethylene copolymer, ethylene/vinyl alcohol copolymer, etc. Additives can be included in the composition to impart properties desired for the particular article being manufactured. Such additives include, but are not limited to, fillers, pigments, dyestuffs, antioxidants, stabilizers, processing aids, plasticizers, fire retardants, anti-fog agents, etc.

"Polyolefin" herein means a homopolymer, copolymer, terpolymer etc. of a $C_2$ to $C_{10}$ aliphatic alpha-olefin, such as ethylene, propylene, butylene, hexene, octene, norbornene, and the like. "Ethylene/alpha-olefin copolymer" (EAO) herein refers to copolymers of ethylene with one or more comonomers selected from $C_3$ to $C_{10}$ alpha-olefins such as propene, butene-1, hexene-1, octene-1, etc. in which the molecules of the copolymers comprise long polymer chains with relatively few side chain branches arising from the alpha-olefin which was reacted with ethylene. This molecular structure is to be contrasted with conventional high pressure low or medium density polyethylenes which are highly branched with respect to EAOs and which high pressure polyethylenes contain both long chain and short chain branches. EAO includes such heterogeneous materials as linear medium density polyethylene (LMDPE), linear low density polyethylene (LLDPE), and very low and ultra low density polyethylene (VLDPE and ULDPE), such as DOWLEX™ or ATTANE™ resins supplied by Dow, ESCORENE™ or EXCEED™ resins supplied by Exxon; as well as linear homogeneous ethylene/alpha olefin copolymers (HEAO) such as TAFMER™ resins supplied by Mitsui Petrochemical Corporation, EXACT™ resins supplied by Exxon, or long chain branched (HEAO) AFFINITY™ resins supplied by the Dow Chemical Company, or ENGAGE™ resins supplied by DuPont Dow Elastomers. EAO also includes IPN resins, such as Elite™ resins supplied by Dow.

"Host polymer or host resin" herein mean polymers that may be used to formulate the outermost and substrate layers of the packaging films of the invention and which house the amidic waxes. Host polymers that may be used typically include the following polymers, their copolymers or blends: polyethylene, ethylene/alpha olefin copolymer, ethylene/vinyl acetate copolymer, ionomer resin, ethylene/acrylic or methacrylic acid copolymer, ethylene/acrylate or methacrylate copolymer, low density polyethylene, high density polyethylene, polypropylene, propylene/ethylene copolymer, propylene/ethylene/butene terpolymer, polystyrene, syndiotactic polystyrene, ethylene/styrene copolymer, and norbornene/ethylene copolymer.

"Core layer" herein means a central layer(s) of a multi-layer film; in a three layer film, the core layer is the second layer in the sequence of layers; in a five layer film, the core layer is the third layer in the sequence of layers.

"Substrate layer" herein means an inner host layer of a multi-layer film, not an outermost layer of the film; in a three layer film, the substrate layer is disposed between the respective outermost layers; in a four layer film, the substrate layers are the second and third layers in the sequence of layers and disposed between the respective outermost layers; in a five layer film, the substrate layer(s) denote the host layer(s) disposed between outermost layers.

"Interpenetrating Network Polymer" (IPN resin) herein refers to multicomponent molecular mixtures of polymer chains. Because of molecular mixing, IPN resins cannot be separated without breaking chemical bonds. Polymer chains combined as IPN resins are interlaced at a molecular level and are thus considered true solid state solutions. Interpenetrating networks, unlike blends, become new compositions exhibiting properties distinct from parent constituents. Interpenetrating networks provide phase co-continuity leading to surprising enhancement of physical properties. Due to the mixture of at least two molecular types, these compositions may exhibit bimodal or multimodal curves when analyzed using TREF or CRYSTAF. Interpenetrating networks as herein used includes semi-interpenetrating networks and therefore describes crosslinked and uncrosslinked multi-component molecular mixtures having a low density fraction and a high density fraction. Specific production methods for preparing IPN resins useful for carrying out the present invention, are disclosed in U.S. Pat. No. 5,747,594 (deGroot et al.), U.S. Pat No. 5,370,940 (Hazliff et al.), and WO 94/17112 (Kolthammer), all herein incorporated by reference in their entirety. IPN resins can be prepared using a parallel or sequential multiple reactor scheme, and can be produced from a solution polymerization scheme. Alternatively, IPNs useful for the inventive films may be prepared within a single reactor by completing polymerization of the heterogeneous component prior to initiating the polymerization of the homogeneous component. Examples of catalysts suitable for producing the homogeneous component are described in U.S. Pat. Nos. 5,026,798 and 5,055,438 (Canich); U.S. Pat. No. 3,645,992(Elston); U.S. Pat. No. 5,017,714 (Welborn); and U.S. Pat. No. 4,076,698 (Anderson); all herein incorporated by reference in their entirety.

"Homogeneous" herein refers to polymerization reaction products of relatively narrow molecular weight distribution ($M_w/M_n$ less than or equal to 3.0) and relatively narrow composition distribution. Homogeneous polymers are structurally different from heterogeneous polymers, in that homogeneous polymers exhibit a relatively even sequencing of comonomers within a chain, a mirroring of sequence distribution in all chains, and a similarity of length of all chains, i.e., a narrower molecular weight distribution. Furthermore, homogeneous polymers are typically prepared using metallocene or other single-site catalysts, rather than, for example, Ziegler Natta catalysts. Processes for preparing and using linear homogeneous polyolefins are disclosed in U.S. Pat. No. 5,206,075, U.S. Pat. No. 5,241,031, PCT International Application WO 93/03093, U.S. Pat. Nos. 5,026,798 and 5,055,438 (Canich); U.S. Pat. No. 3,645,992(Elston); U.S. Pat. No. 5,017,714 (Welborn); and U.S. Pat. No. 4,076,698 (Anderson); each of which is hereby incorporated by reference thereto, in its entirety. Further details regarding the production and use of linear homogeneous ethylene/alpha-olefin copolymers are disclosed in PCT International Publication Number WO 90/03414, and PCT International Publication Number WO 93/03093, both of which designate Exxon Chemical Patents, Inc. as the Applicant, and both of which are hereby incorporated by reference thereto, in their respective entireties. Still another genus of homogeneous polyolefins is disclosed in U.S. Pat. No. 5,272,236, to LAI, et. al., and U.S. Pat. No. 5,278,272, to LAI, et. al., both of which are hereby incorporated by reference thereto, in their respective entireties. Each of these patents disclose "substantially linear" homogeneous long chain branched ethylene/alpha-olefin copolymers produced and marketed by The Dow Chemical Company. Still another genus of homogeneous polyolefins is homogeneous hyper-branched polyolefins, which is inclusive of SSH polyolefin. The phrase "substantially spherical homogeneous polyolefin" (i.e.,"SSH polyolefin") refers to single site catalyzed resin with a polymer architecture wherein there are at least 50 side branches, such as at least 60 side branches, from the main chain for every 1000 main chain carbons. Hyper-branched homogeneous polyethylene, while resembling other homogeneous resins in aspects such as low polydispersity index ($M_w/M_n$ of less than or equal to 3.0, such as less than 2.7, or having a $M_w/M_n$ of from 1.9 to 2.5), do not resemble commercial linear homogenous ethylene/alpha-olefin copolymer, or long chain branched homogeneous ethylene/alpha-olefin copolymer, at least in that the hyper-branched homogeneous polyethylenes may be characterized as having a mixed population of side chains of different chain length, together with a high side chain branching level. Additionally, it is possible that at least some of the short chain side branches of the hyperbranched homogeneous polyethylene are themselves short chain branched. While the molecular weight is similar from one polymer chain to the next, the different side branch length and/or structure affects the crystallinity in a different manner than commercial homogeneous resins such as Mitsui TAFMER® polymer or Dow ENGAGE® polymer.

"Heterogeneous" herein refers to polymerization reaction products of relatively wide variation in molecular weight ($M_w/M_n$ greater than 3.0) and relatively wide variation in composition distribution, i.e., typical polymers prepared, for example, using conventional Ziegler-Natta catalysts. Heterogeneous copolymers typically contain a relatively wide variety of main chain lengths and comonomer percentages. Processes for preparing heterogeneous geneous resins are described in U.S. Pat. No. 4,314,912 (Lowery et al.), U.S. Pat. No. 4,547,475 (Glass et al.), and U.S. Pat. No. 4,612,300 (Coleman, III); all incorporated herein by reference in their entirety.

"Transition metal salt of stearic acid, or ester of stearic acid" herein means a transition metal salt of stearic acid, such as zinc stearate; or an ester of stearic acid, such as glycerol monostearate; or a blend thereof.

"Antiblock agents" herein means particles which may be used to lower the coefficient of friction and/or adhesion of outer film surfaces, and includes various silicas (fumed, precipitated, gelled, etc.), natural silicates (talc, diatomaceous earth, etc.), magnesium silicate, carbonates, synthetic silicate, natural alumina; synthetic alumina, alumino silicate, synthetic particulates (uncrosslinked styrenic polymeric particles, crosslinked styrenic polymeric particles, high molecular and ultrahigh molecular weight siloxanes, uncrosslinked acrylic polymeric particles, crosslinked acrylic polymeric particles, polyethylene particles, styrenic, acrylic, siloxane, fluoropolymer, etc.), etc. Other types of antiblock agents include amidic waxes such as the bis fatty amides. Antiblock quantities depend at least in part depend on particle size. Generally, the larger the particle, the less needed. When the size is less than one micron, for example, 20,000 ppm provides adequate slip properties, whereas for a particle size of about 5 μ, about 1000 ppm antiblock loading provides the same effect. Specific methods for producing films having good antiblocking performance are disclosed in U.S. Pat. No. 5,925,454 (Bekele), herein by reference in its entirety.

"Heat shrinkable" herein refers to a property of a material which, when heated to a temperature of 200° F., will exhibit a free shrink (ASTM D 2732-83) of at least 8% in the longitudinal direction, and at least 8% in the transverse directions of the film. Heat shrinkable films of this invention are solid state oriented as contrasted to hot blown films which are melt state oriented. Heat shrinkable films exhibit free shrink at their softening point as contrasted to hot blown (single bubble) film which do not show shrink performance at low temperatures and must be heated to temperatures approaching the melting point of film resins.

"Amidic wax" herein refers to primary, secondary, tertiary, or bis(fatty) amides. Examples of the different types include primary fatty amides such as erucamide, behenamide, oleamide, or stearamide; secondary fatty amides such as stearylerucamide, erucylerucamide, oleylpalmitamide, stearylstearamide, or erucylstearamide; tertiary fatty amides such as dimethylstearamide, diethylstearamide; and N,N'-bis (fatty) amides such as N,N'-ethylene bis(stearamide), N,N'-methylene bis(stearamide), N,N'-ethylene bis(oleamide), or N,N'-propylene bis(oleamide). These waxes can be used with the present invention singularly or in combination.

All compositional percentages used herein are presented on a "by weight" basis, unless designated otherwise.

SUMMARY OF THE INVENTION

In a first aspect of the invention, a multilayer film comprises a first and second outer layer each comprising a polymer, a core layer comprising a polymer; and a first and second substrate layer each comprising a polymer, the first and second substrate layers disposed between the core layer and the first and second outer layers respectively; wherein at least one of the first and second substrate layers comprises an amidic wax, and wherein at least one of the first and second outer layers comprises an amidic wax, the amidic wax present in an amount of 1% to 50% of the amount of wax in the first and second substrate layers respectively.

In a second aspect of the invention, a multilayer film comprises a first and second outer layer each comprising a polymer, a core layer comprising a polymer; and a first and second substrate layer each comprising a polymer, the first and second substrate layers disposed between the core layer and the first and second outer layers respectively; wherein at least one of the first substrate layer, the second substrate layer, the first outer layer, and the second outer layer, comprises a blend of i) amidic wax and ii) transition metal salt of stearic acid, or ester of stearic acid.

In a third aspect of the invention, a multilayer film comprises a first and second outer layer each comprising a polymer; and a substrate layer comprising a polymer; wherein at least one of the first outer layer, second outer layer, and substrate layer, comprises a blend of i) amidic wax and ii) transition metal salt of stearic acid, or ester of stearic acid.

BRIEF DESCRIPTION OF THE DRAWINGS

The accompanying drawings illustrate several embodiments of the invention.

DETAILED DESCRIPTION OF THE INVENTION

Film in accordance with the invention can include three, four, five or more layers. The multilayer film can be manufactured by a variety of processes including, extrusion, coextrusion, lamination, coating, etc. and centerfolding, pouch, or bag manufacturing processes.

EXAMPLES

Example 1

Figure 1:
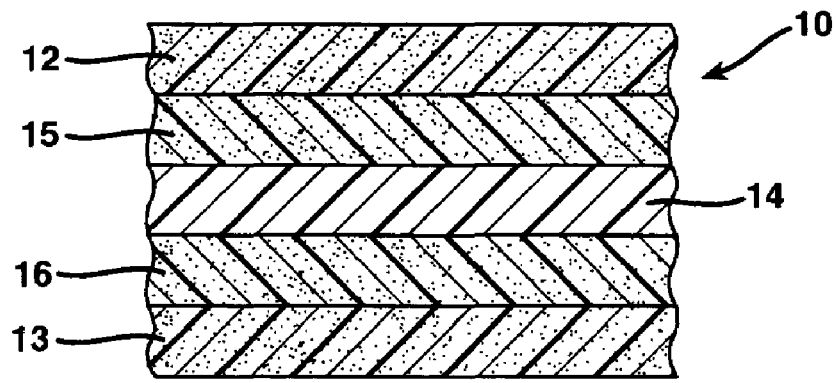
FIG. 1 is a cross-sectional view of a film in accordance with the invention.

Referring to FIG. 1, a five layer multilayer polymeric film 10 comprises a first outer layer 12 and second outer layer 13 each comprising a polymer; a core layer 14 comprising a polymer; and a first substrate layer 15 and second substrate layer 16 each comprising a polymer, the first and second substrate layers disposed between the core layer and respective outer layers. The first and second substrate layers each comprises an amidic wax, and the first and second outer layers each comprises an amidic wax in an amount of 1% to 50% of the amount of amidic wax in the first and second substrate layers respectively.

Alternatively, the first and second outer layers are free or substantially free of amidic wax.

The polymer of the first and second outer layers, the core layer, and the first and second substrate layers can comprise any of the host polymers listed above.

The amidic wax of the first and second substrate layers, and of the first and second outer layers, can comprise any of the amidic waxes listed above. The amidic wax of the substrate layers can comprise from 4,000 ppm to 20,000 ppm, such as 8,000 ppm to 15,000 ppm, or 10,000 to 12,000 ppm, by weight of each of the first and second substrate layers. The amidic wax of the outer layers can comprise 1% to 50%, such as 5% to 45%, 10% to 40%, 15% to 35%, or 20% to 30%, of the amount of amidic wax in the substrate layers. The amidic wax of the outer layers can comprise less than 50%, such as less than 40%, such as less than 30%, less than 20%, and less than 10%, of the amount of amidic wax in the substrate layers. The amidic wax of the outer layers can comprise 1,000 ppm to 10,000 ppm, such as between 2,000 ppm and 8,000 ppm, or 3,000 ppm and 6,000 ppm, by weight of each of the first and second outer layers.

The amount and composition of wax in the first and second substrate layers can differ from each other, as can the amount and composition of wax in each of the first and second outer layers.

The amount and composition of wax in the first and second substrate layers can be the same or substantially the same, as can the amount and composition of wax in each of the first and second outer layers.

The composition of wax in the first and second substrate layers can differ from the composition of wax in the first and second outer layers.

The composition of wax in the first and second substrate layers can be the same or substantially the same, as the composition of wax in the first and second outer layers.

The first and second outer layers can each comprise an antiblock agent, such as those listed above, in any suitable amount, such as 50 ppm to 20,000 ppm, 100 to 18,000 ppm, 500 to 15,000 ppm, 1,000 to 10,000 ppm, and 3,000 to 8,000 ppm.

Unless indicated otherwise, percentages of antiblock indicated herein refer to the percentage of the antiblock material per se, not the percentage of a masterbatch or other carrier in which the antiblock is supported.

In one embodiment, the first and second outer layers each comprises ethylene/alpha olefin copolymer and/or ethylene/vinyl acetate copolymer; the core layer comprises linear low density polyethylene; and the first and second substrate layers each comprises ethylene/alpha olefin copolymer and/or ethylene/vinyl acetate copolymer; with amidic wax in the first and second substrate layers.

In another embodiment, the first and/or second outer layers each comprises ethylene/alpha olefin copolymer and/or ethylene/vinyl acetate copolymer; the core layer comprises linear low density polyethylene; and the first and second substrate layers each comprises ethylene/alpha olefin copolymer and/or ethylene/vinyl acetate copolymer; with amidic wax in the first and/or second substrate layers, and in the first and/or second outer layers.

The final film has first and/or second outer layers having an outside surface coating of 3 to 15 micrograms/inch$^2$, such as 4 to 15 micrograms/inch$^2$, 5 to 12 micrograms/inch$^2$, or 6 to 10 micrograms/inch$^2$ of amidic wax. The final film has first and/or second outer layers having an outside surface coating of more than 3 micrograms/inch$^2$, such as more than 4, 5, 6, 7, or 8 micrograms/inch$^2$ of amidic wax.

Example 2

Figure 2:
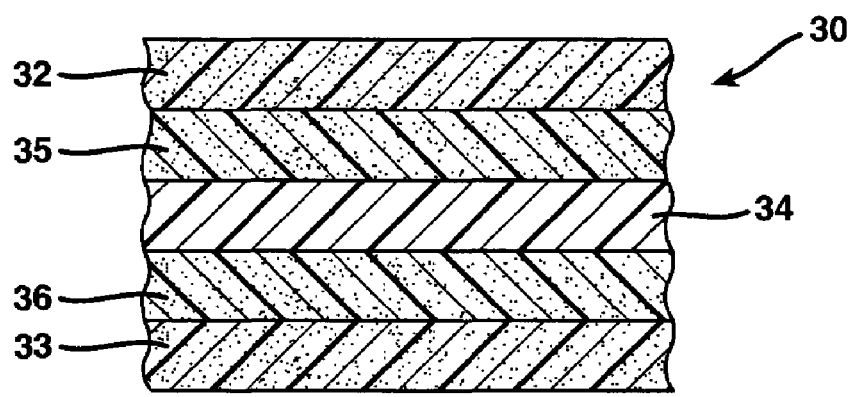
FIG. 2 is a cross-sectional view of a second embodiment of a film in accordance with the invention.

Referring to FIG. 2, a five layer multilayer polymeric film 30 comprises a first outer layer 32 and second outer layer 33 each comprising a polymer; a core layer 34 comprising a polymer; and a first substrate layer 35 and second substrate layer 36 each comprising a polymer, the first and second substrate layers disposed between the core layer and respective outer layers. At least one of i) the first and second substrate layers, and ii) the first and second outer layers, comprises a blend of i) amidic wax and ii) transition metal salt of stearic acid, or ester of stearic acid.

The polymer of the first and second outer layers, the core layer, and the first and second substrate layers can comprise any of the host polymers listed above.

The amidic wax of the first and second substrate layers, and of the first and second outer layers, can comprise any of the amidic waxes listed above, in the proportions noted for Example 1.

The first and second outer layers can each comprise an antiblock agent, such as those listed above, in the proportions noted for Example 1.

In one embodiment, the first and second outer layers each comprises ethylene/alpha olefin copolymer and/or ethylene/vinyl acetate copolymer; the core layer comprises linear low density polyethylene; and the first and second substrate layers each comprises ethylene/alpha olefin copolymer and/or ethylene/vinyl acetate copolymer; with a blend of i) amidic wax, and ii) transition metal salt of stearic acid, or ester of stearic acid, in the first and second substrate layers.

In another embodiment, the first and second outer layers each comprises ethylene/alpha olefin copolymer and/or ethylene/vinyl acetate copolymer; the core layer comprises linear low density polyethylene; and the first and second substrate layers each comprises ethylene/alpha olefin copolymer and/or ethylene/vinyl acetate copolymer; with a blend of i) amidic wax, and ii) transition metal salt of stearic acid, or ester of stearic acid, in the first and second substrate layers, and in the first and second outer layers.

In yet another embodiment, the first and second outer layers each comprises ethylene/alpha olefin copolymer and/or ethylene/vinyl acetate copolymer; the core layer comprises linear low density polyethylene; and the first and second substrate layers each comprises ethylene/alpha olefin copolymer and/or ethylene/vinyl acetate copolymer; with a blend of i) amidic wax, and ii) transition metal salt of stearic acid, or ester of stearic acid, in the first and second outer layers.

The final film has first and second outer layers each having an outside surface wax level as indicated in Example 1.

The transition metal salt of stearic acid, or ester of stearic acid, can comprise 500 ppm to 5,000 ppm, such as 1,000 to 4,000 ppm, or 2,000 to 3,000 ppm, by weight of each of the first and second substrate layers, and each of the first and second outer layers.

Example 3

Figure 3:
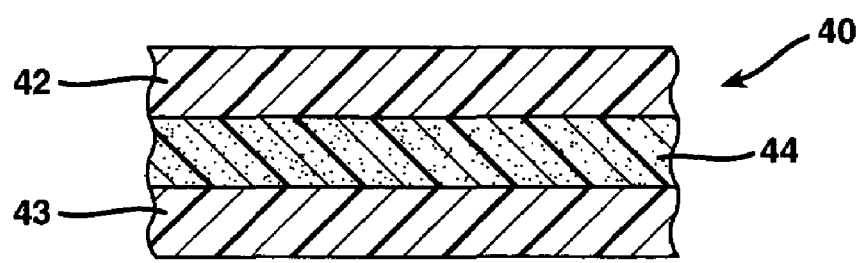
FIG. 3 is a cross-sectional view of a third embodiment of a film in accordance with the invention.

Referring to FIG. 3, a three layer multilayer polymeric film 40 comprises a first outer layer 42 and second outer layer 43 each comprising a polymer; and a substrate layer 44 comprising a polymer. The substrate layer comprises a blend of i) amidic wax, and ii) transition metal salt of stearic acid, or ester of stearic acid.

In one embodiment, the first and second outer layers also each comprises a blend of an amidic wax and a transition metal salt of stearic acid, or ester of stearic acid.

In another embodiment, the first and second outer layers each comprises an amidic wax in an amount of 1% to 50%, such as 5% to 45%, 10% to 40%, 15% to 35%, or 20% to 30%, of the amount of amidic wax in the substrate layer.

The polymer of the first and second outer layers, and the substrate layer, can comprise any of the host polymers listed above.

The amidic wax of the substrate layer, and of the first and second outer layers, can comprise any of the amidic waxes listed above The amidic wax of the substrate layer can comprise 4,000 ppm to 20,000 ppm, such as 8,000 ppm to 15,000 ppm, or 10,000 to 12,000 ppm, by weight of the substrate layer. The amidic wax of the first and second outer layers can comprise less than 50%, such as less than 40%, such as less than 30%, less than 20%, and less than 10%, of the amount of amidic wax in the substrate layer. The amidic wax of the outer layers can comprise between 1,000 ppm and 10,000 ppm, such as between 2,000 ppm and 8,000 ppm, or 3,000 ppm and 6,000 ppm, by weight of each of the first and second outer layers.

The amount and/or composition of wax in each respective outer layer can differ from each other, as can the amount and/or composition of wax in each respective outer layer compared with the substrate layer.

The amount and/or composition of wax in each respective outer layer can be the same or substantially the same.

The amount and composition of wax in each respective outer layer can be less than, the same, or substantially the same, as the amount and/or composition of wax in the substrate layer.

The first and second outer layers can each comprise an antiblock agent, such as those listed above, in the proportions noted for Example 1.

In one embodiment, the first and second outer layers each comprises ethylene/alpha olefin copolymer and/or ethylene/vinyl acetate copolymer; and the substrate layer comprises linear low density polyethylene; with a blend of i) amidic wax, and ii) transition metal salt of stearic acid, or ester of stearic acid, in the substrate layer.

In another embodiment, the first and second outer layers each comprises ethylene/alpha olefin copolymer and/or ethylene/vinyl acetate copolymer; and the substrate layer comprises linear low density polyethylene; with a blend of amidic wax and a transition metal salt of stearic acid, or ester of stearic acid in the first and second outer layers, and in the substrate layer.

The final film has first and second outer layers each having an outside surface wax coating as indicated in Example 1.

The transition metal salt of stearic acid of the substrate layer, and of the first and second outer layers, can comprise e.g. a late transition metal stearate such as zinc stearate. Transition metal stearate selection is based upon non-food or food applications, where food regulatory issues can restrict use of certain types. Transition metal salts of stearic acid are to be contrasted to alkali metal salts such as calcium stearate. Esters of stearic acid include glycerol monostearate.

The transition metal salt of stearic acid, or ester of stearic acid, can comprise 500 ppm to 10,000 ppm, such as 1,000 to 7,000 ppm, 2,000 to 6,000 ppm, or 3,000 to 5,000 ppm, by weight of the substrate layer, and each of the first and second outer layers.

Example 4

A film is made like that of Example 3, but in which the first and second outer layers each comprises ethylene/alpha olefin copolymer and/or ethylene/vinyl acetate copolymer with a blend of i) amidic wax, and ii) transition metal salt of stearic acid, or ester of stearic acid, in the first and second outer layers; and the substrate layer comprises linear low density polyethylene.

Further Examples and Comparative Examples

Heat shrinkable films of the following inventive examples, as well as comparative film examples, were made by downward cast extrusion (for monolayer films) or coextrusion (for multilayer films) by techniques well known in the art. Precursor films were quenched to solid state using cascading water, reheated to their orientation temperature, stretched at a ratio of about 3-5:1 in each of the longitudinal and transverse directions by a conventional trapped bubble process, cooled below their orientation temperature, resulting in a heat shrinkable film, and then wound into rolls over paper cores. Films were alternatively irradiated by electron beam irradiation at a dosage of between 10 and 35 kiloGrays.

Heat shrinkable films of the present invention can be made by any suitable process, including coextrusion, lamination, extrusion coating, or corona bonding and may be made by tubular cast coextrusion, such as that shown in U.S. Pat. No. 4,551,380 [Schoenberg], or U.S. Pat. No. 6,423421 [Banaszak], or U.S. Pat. No. 6,514583 [Ahlgren] each herein incorporated by reference in its entirety. Bags made from the film can be made by any suitable process, such as that shown in U.S. Pat. No. 3,741,253 (Brax et al.), hereby incorporated by reference in its entirety. Side or end sealed bags can be made from single wound or double wound films. Films of the present invention can be oriented by any suitable process, including a trapped bubble process, or a simultaneous tenterframe process such as that shown in U.S. Pat. No. 6,106,934 (Forloni) hereby incorporated by reference in its entirety. Film of the present invention can have any total thickness desired, so long as the film provides the desired properties for the particular packaging operation in which the film is used. Final film thicknesses can vary, depending on process, end use application, etc. Typical thicknesses range from 0.1 to 20 mils, such as 0.2 to 15 mils, more such as 0.3 to 10 mils, more such as 0.3 to 5 mils, more such as 0.3 to 2 mils, such as 0.3 to 1 mil.

Films of the present invention can have an Elmendorf tear value (ASTM 1922) of between 25 and 50 grams in both of the longitudinal and transverse directions. Films of the present invention can have a haze value of between 0.1 and 5, such as between 0.1 and 4.5, or between 0.1 and 4, or between 0.1 and 3.5, or between 0.1 and 3, or between 0.1 and 2.5, and between 0.1 and 2. Film of the invention can have a haze value of 5 or less than 5, 4 or less than 4, 3.5 or less than 3.5, 3 or less than 3, 2.5 or less than 2.5, 2 or less than 2, or 1 or less than 1.

Example 5

A palindromic five layer precursor film having the structure first outer layer/first substrate layer/core layer/second substrate layer/second outer layer was coextruded and water quenched having the following relative layer thickness:

A/B/C/B/A 12.5/12.5/50/12.5/12.5

The polymers of first and second outer (A) layers as well as the first and second (B) substrate layers were blends of 25% Huntsman PE 1335, an ethylene vinyl acetate having 3.3% vinyl acetate, 50% DOWLEX™2045 from Dow Chemical, an ethylene/octene copolymer having a density of 0.920 g/cm³, and 25% DOWLEX™2037, an ethylene/octene copolymer having a density of 0.935 g/cm³, the polymers of core (C) layer was DOWLEX™2045. The precursor film was, irradiated by electron beam irradiation at a dosage of between 10 and 35 kiloGrays, and reheated to its orientation temperature, and then stretched by a conventional trapped bubble process at a ratio of about 5:1 in each of the longitudinal and transverse directions.

The five layer film was then cooled using forced air and collected as roll of film using a mechanical winder. Each A layer contained 1500 ppm of Crompton KEMAMIDE w20™ ethylene bis-oleamide, 2000 ppm Crompton Zinc Stearate, and 4000 ppm Crompton KEMAMIDE W-40™ N,N'-ethylene bis-stearamide, while each B layer contained 5000 ppm Crompton KEMAMIDE E™ erucamide, 5000 ppm Crompton KEMAMIDE VO™ oleamide, 2000 ppm Crompton KEMAMIDE W-40™ N,N'-ethylene bis-stearamide and 2000 ppm Crompton Zinc Stearate. No additives were placed in the core layer.

Example 6

A palindromic five layer precursor film having the structure first outer layer/first substrate layer/core layer/second substrate layer/second outer layer was coextruded and water quenched having the following relative layer thickness:

A/B/C/B/A

10/10/60/10/10

The polymers of first and second outer (A) layers as well as the first and second (B) substrate layers were blends of 43% Dow AFFINITY™ PL 1880™, a homogeneous ethylene/alpha- olefin having a density of 0.902 g/cm³, 31% DOWLEX™2045 from Dow Chemical, an ethylene/octene copolymer having a density of 0.920 g/cm³, and 26% DOWLEX™2037, an ethylene/octene copolymer having a density of 0.935 g/cm³, the polymers of core (C) layer were blends of 43% Dow AFFINITY™ PL 1880™, 38.2% DOWLEX™2037, and 18.8% DOWLEX™2045. The precursor film was, irradiated by electron beam irradiation at a dosage of between 10 and 35 kiloGrays, and reheated to its orientation temperature, and then stretched by a conventional trapped bubble process at a ratio of about 5:1 in each of the longitudinal and transverse directions.

The five layer film was then cooled using forced air and collected as roll of film using a mechaniacal winder. Each A layer contained 2400 ppm of Crompton KEMAMIDE E™ erucamide, 2000 ppm Crompton Zinc Stearate, and 5900 ppm Crompton KEMAMIDE W-40™ N,N'-ethylene bis-stearamide, while each B layer contained 8000 ppm Crompton KEMAMIDE E™ erucamide, 8000 ppm Crompton KEMAMIDE VO™ oleamide, 5000 ppm Crompton KEMAMIDE W-40™ N,N'-ethylene bis-stearamide, and 2000 ppm Crompton Zinc Stearate. No additives were placed in the core layer.

Example 7

A five layer heat shrinkable film was prepared according to the procedure set forth in Example 6 with the following compositional exceptions: the polymers of first and second outer (A) layers were formed of a blend of 34% Dow AFFINITY™ PL 1840™, a single site catalyzed ethylene/alpha olefin copolymer with a density of 0.909 g/cm³, 50% ethylene octene IPN, and 16% DOWLEX™2247, an ethylene/alpha olefin copolymer with a density of 0.917 g/cm³, the first and second (B) substrate layers were blends of, 50% ethylene octene IPN, 30% Dow AFFINITY PL 1840, and 20% DOWLEX2247; the core layer (C) was formed of a blend of 75% by weight of Dow XUS 59900.48, an ethylene/octene IPN having a density of 0.923 and 25% Dow AFFINITY™ PL 1840™, a long chain branched homogeneous ethylene/alpha-olefin copolymer having a density of 0.909 g/cm³. Each A layer contained 2000 ppm of Crompton KEMAMIDE E™ erucamide, 1650 ppm Crompton Zinc Stearate, and 5000 ppm Crompton KEMAMIDE W-40™ N,N'-ethylene bis-stearamide, while each B layer contained 7600 ppm Crompton KEMAMIDE E™ erucamide, 7600 ppm Crompton KEMAMIDE VO™ oleamide, 4600 ppm Crompton KEMA- MIDE W-40™ N,N'-ethylene bis-stearamide, and 2000 ppm Crompton Zinc Stearate. No additives were placed in the core (C) layer.

Example 8

A five layer heat shrinkable film was prepared according to the procedure set forth in Example 7 with the following compositional exceptions: the polymers of first and second outer (A) layers were formed of a blend of 17% Dow ATTANE™ 4202, 67% ethylene/octene IPN1, and 16% DOWLEX™2247; the first and second (B) substrate layers were blends of 67% ethylene/octene IPN, 13% Dow ATTANE™ 4201 an ethylene/octene copolymer (VLDPE) having a density of 0.912 g/cm$^3$, and 20% DOWLEX™2247; and the core layer; (C) was formed of a blend of 75% by weight of Dow XUS 59900.48™, an ethylene/octene IPN having a density of 0.923 and 25% Dow ATTANE™ 4201, an ethylene/octene copolymer (VLDPE) having a density of 0.912 g/cm$^3$.

Example 9

A five layer heat shrinkable film was prepared according to the procedure set forth in Example 8 except that the polymers of the first and second outer (A) layers were formed of a blend of 84% ethylene/octene IPN1, and 16% DOWLEX™2247; the composition of the first and second (B) substrate layers were blends of 40% ethylene/octene IPN, 40% Dow ATTANE™ 4201 an ethylene/octene copolymer (VLDPE) having a density of 0.912 g/cm$^3$, and 20% DOWLEX™2247.

Example 10

A five layer heat shrinkable film was prepared according to the procedure set forth in Example 7 with the following compositional exceptions: the polymers of first and second outer (A) layers were formed of a blend of 84% ethylene/octene IPN, and 16% DOWLEX™2247; the first and second (B) substrate layers were blends of 80% ethylene/octene IPN and 20% DOWLEX™2247; and the core layer; (C) was formed of a blend of 75% by weight of Dow XUS 59900.48™, an ethylene/octene IPN having a density of 0.923 and 25% Exxon EXACT™ 4151, a linear homogeneous ethylene/hexene copolymer having a density of 0.895 g/cm$^3$.

Example 11

A five layer heat shrinkable film was prepared according to Example 10 except the core layer (C) was formed of a blend of 60% by weight of Dow XUS 59900.48™, an ethylene/octene IPN having a density of 0.923 and 40% Exxon EXACT™ 4151, a linear homogeneous ethylene/hexene copolymer having a density of 0.895 g/cm$^3$.

Comparative Example 12

A palindromic three layer precursor film having the structure first outer layer/core layer/second outer layer was coextruded and water quenched having the following relative layer thickness:

A/C/A

20/60/20

The polymers of first and second outer (A) layers were blends of 25% Huntsman PE 1335, an ethylene vinyl acetate having 3.3% vinyl acetate, 50% DOWLEX™2045 from Dow Chemical, an ethylene/octene copolymer having a density of 0.920 g/cm$^3$, and 25% DOWLEX™2037, an ethylene/octene copolymer having a density of 0.935 g/cm$^3$, the polymers of core (C) layer was Dow XUS 59900.48™. The precursor film was irradiated by electron beam irradiation at a dosage of between 20 and 35 kiloGrays, and reheated to its orientation temperature, and then stretched by a conventional trapped bubble process at a ratio of about 5:1 in each of the longitudinal and transverse directions to provide a heat shrinkable film.

The three layer film was then cooled using forced air and collected as roll of film using a mechanical winder. Each A layer contained 6100 ppm of Crompton KEMAMIDE E™ erucamide, 1000 ppm KEMAMIDE B™ behenamide, and 5900 ppm Crompton KEMAMIDE W-40™ N,N'-ethylene bis-stearamide. No additives were placed in the core layer.

TABLE 1

Properties of the films and additional details of the invention are given below.

| Example | Elmendorf Tear, g/mil | Composite core layer density, g/cm$^3$ |
|---|---|---|
| Ex. 5 | 30 | 0.9200 |
| Ex. 6 | 37.4 | 0.921 |
| Ex. 7 | 27.0 | 0.9200 |
| Ex. 8 | 28.6 | 0.9206 |
| Ex. 9 | 28.2 | 0.9202 |
| Ex. 10 | 36.9 | 0.9158 |
| Ex. 11 | 39.2 | 0.9157 |
| Comp. Ex. 12 | 14.0 | 0.923 |

Table 1 includes certain embodiments in which films having good slip properties also exhibit relatively high Elmendorf tear values when the core layer has a density no greater than 0.922 g/cm$^3$. Comparative Example 12, in addition to lacking the control of wax bloom time and surface wax uniformity of films of the invention, has a core layer density above 0.922 g/cm$^3$, and showed a lower Elmendorf tear film than certain films of the invention. Some embodiments of the invention can provide an Elmendorf tear value of at least 28 g/mil, such as 30 g/mil, or having Elmendorf tear values of 25 g/mil to 50 g/mil, such as 30 g/mil to 50 g/mil. By selecting the proper density for the core layer, one may provide films having controlled bloom of waxes and also exhibiting Elmendorf tear values as high as a commercial film, Cryovac D955™, a film having an Elmendorf tear value of about 32 g/mil.

Table 2 shows general film structures that can be made in accordance with the invention, including typical ranges of components for each layer.

TABLE 2

Typical five layer film structures with components

| Layer 1 Outer 5-15% | | Layer 2 Substrate 5-15% | | Layer 3 Core 40-80% | Layer 4 Substrate 5-15% | | Layer 5 Outer 5-15% | |
|---|---|---|---|---|---|---|---|---|
| Component | Range ppm | Component | Range ppm | Component | Component | Range ppm | Component | Range ppm |
| KEMAMIDE VO ™ Oleamide | 0-2000 | KEMAMIDE VO ™ Oleamide | 4000-10000 | | KEMAMIDE VO ™ Oleamide | 4000-10000 | KEMAMIDE VO ™ Oleamide | 0-2000 |
| KEMAMIDE E ™ Erucamide | 0-2500 | KEMAMIDE E ™ Erucamide | 4000-10000 | | KEMAMIDE E ™ Erucamide | 4000-10000 | KEMAMIDE E ™ Erucamide | 0-2500 |
| KEMAMIDE W-20 ™ Ethylene bis-oleamide | 0-3000 | KEMAMIDE W-40 ™ Ethylene bis-stearamide | 1000-7000 | | KEMAMIDE W-40 ™ Ethylene bis-stearamide | 1000-7000 | KEMAMIDE W-20 ™ Ethylene bis-oleamide | 0-3000 |
| KEMAMIDE W-40 ™ Ethylene bis-stearamide | 1000-7000 | Zinc Stearate | 0-2000 | | Zinc Stearate | 0-2000 | KEMAMIDE W-40 ™ Ethylene bis-stearamide | 1000-7000 |
| Zinc Stearate | 0-2000 | | | | | | Zinc Stearate | 0-2000 |
| 3M W210 ZEEO-SPHERES ™ aluminosilicate | 0-3000 | | | | | | 3M W210 ZEEO-SPHERES ™ aluminosilicate | 0-3000 |
| Grace Davison SYLOBLOC ™ M150 Silica and oleamide | 0-3000 | | | | | | Grace Davison SYLOBLOC ™ M150 Silica and oleamide | 0-3000 |
| Grace Davison SYLOBLOC ™ M250 Silica and erucamide | 0-3000 | | | | | | Grace Davison SYLOBLOC ™ M250 Silica and erucamide | 0-3000 |
| Balance polyolefins | | Balance polyolefins | | | Balance polyolefins | | Balance polyolefins | |

Notes for Table 2:
1. The gauge of these films can be e.g. from 0.4 to 1.25 mil.
2. Thickness of each layer, as a percentage of total film thickness, is shown in the second row of Table 2.
3. The composition of each layer is shown in Table 2. Each layer comprises a polymer, identified in Table 3 below, and additives which are shown in Table 2.
4. It was observed that once the outer layer (Layer 1) gets above about 12% thickness the wax doesn't have time migrate to the surface and most slip effect is lost.
5. The outer two layers can be symmetrical or independent in composition, i.e. first outer layer 1 and second outer layer 5 can differ in composition. The same is true for first substrate layer 2 and second substrate layer 4.
6. The film can be constructed in 3 or more layers.
7. In each of layers 1 through 5, the layer comprises a polymer, such as one of the host polymers disclosed herein. The amidic wax and antiblock components indicated in Table 2 are added to the respective host polymer via masterbatch or other suitable means well known inthe art, generally prior to extrusion or coextrusion of the respective layers by conventional extrusion processes.

TABLE 3

| Layer 1 | EAO and/or ethylene/vinyl acetate copolymer | Some slip + antiblock |
|---|---|---|
| Layer 2 | EAO and/or ethylene/vinyl acetate copolymer | High level of slip |
| Layer 3 | ethylene/alpha olefin copolymer | no slip agents |
| Layer 4 | EAO and/or ethylene/vinyl acetate copolymer | High level of slip |
| Layer 5 | EAO and/or ethylene/vinyl acetate copolymer | Some slip + antiblock |

The following additional film examples and comparative examples (13-32) show the inclusion of waxes, erucamide and oleamide, and stearates, zinc stearate and glycerol monostearate, at levels within the guidelines of Table 2. All film structures are 5 layers, unless indicated otherwise. Amide wax values in the tables below are noted in parts per million by weight within each of the outer, substrate, or core layers, as indicated. The amount of wax bloomed to the surface of the film immediately after manufacture is quantified in micrograms per square inch ($\mu g/in^2$).

TABLE 4

| Film | Number of Layers | Outer layers | | Core Layer | |
|---|---|---|---|---|---|
| | | Erucamide | Oleamide | Erucamide | Oleamide |
| Comp. Ex. 13 | 3 | 6100 | 0 | 0 | 0 |
| Comp. Ex. 14 | 3 | 6100 | 0 | 0 | 0 |
| Comp. Ex. 15 | 3 | 6100 | 0 | 0 | 0 |

| Film | Surface Erucamide | Surface Oleamide | Total Surface Amide |
|---|---|---|---|
| Comp. Ex. 13 | 4.9 | 0 | 4.9 |
| Comp. Ex. 14 | 6.2 | 0 | 6.2 |
| Comp. Ex. 15 | 5.0 | 0 | 5.0 |

Comparative Examples 13-15 are palindromic three layer films having a relative layer thickness:

A/C/A

25/50/25

The heat shrinkable films are produced according to the method of Schoenberg (U.S. Pat. No. 4,551,380) incorporated herein in its entirety patent by reference thereto. The polymers of first and second outer (A) layers were blends of 25% Huntsman PE 1335, an ethylene vinyl acetate having 3.3% vinyl acetate, 50% DOWLEX™2045 from Dow Chemical, an ethylene/octene copolymer having a density of 0.920 g/cm$^3$, and 25% DOWLEX™2037, an ethylene/octene copolymer having a density of 0.935 g/cm$^3$, the polymers of core (C) layer was Dowlex™ 2045. The precursor film was, irradiated by electron beam irradiation at a dosage of between 20 and 35 kiloGrays, and reheated to its orientation temperature, and then stretched by a conventional trapped bubble process at a ratio of about 5:1 in each of the longitudinal and transverse directions. Each A layer contained 4000 ppm of Crompton KEMAMIDE E™ erucamide, 4000 ppm Crompton KEMAMIDE W-40™ N,N'-ethylene bis-stearamide, 1000 ppm KEMAMIDE B™ behenamide, and 2000 ppm Celite SUPERFINE SUPERFLOSS™ diatomaceous silica. No additives were placed in the core layer. Comparative film 13 does not exhibit the advantageous higher wax level of a layer underlying a surface layer as with examples of the invention. Nor does this film contain a late transition metal salt or ester of stearic acid to facilitate quick migration of waxes surface of the oriented film. As a result, this prior art film is associated with undesirable transfer of surface waxes to processing equipment during the formation of the precursor film, and does not permit rapid bloom of waxes to the surface of the heat shrinkable oriented film prior to roll winding. It is therefore an example of a heat shrinkable film exhibiting the aforementioned problem of non-uniform wax levels throughout a film roll.

As seen in Table 4, testing of comparative film examples 13-15 indicated that between about 5 and 6 micrograms of erucamide wax per square inch at the surface is present. While this amount of amide wax provided adequate film performance (i.e. high slip or low COF) on packaging equipment with respect to the outer or exterior wraps or winds of the film roll, occasional blocking was experienced as the film roll approached the end near the paper winding core. Also, during the initial steps of producing the film, significant amounts of wax built up on film making equipment located downstream of the extrusion die.

TABLE 5

| Film | Outer layers | | Substrate Layers | | Surface | Surface | Total |
|---|---|---|---|---|---|---|---|
| | Erucamide | Oleamide | Erucamide | Oleamide | Erucamide | Oleamide | Surface Amide |
| Ex. 16 | 2500 | 0 | 0 | 5000 | 2.4 | 3.5 | 5.9 |
| Ex. 17 | 1000 | 0 | 8000 | 0 | 5.9 | 0 | 5.9 |
| Ex. 18 | 1000 | 500 | 0 | 10000 | 1.2 | 7.4 | 8.6 |

In the examples in Table 5 above, the film structure is a 5 layer film. Some amide wax is placed in the outer layers, but significantly less than utilized in a 3 layer film. The substrate layers below the outer layers are each loaded with substantially more wax than that present in the respective outer layers. In these embodiments, the wax does not have enough time to bloom during extrusion and precursor film forming, thereby preventing wax contamination onto the film forming equipment. However, as seen in Table 5 the amount of amide wax at the surface when the film is being wound is equivalent to that of the 3 layer film.

TABLE 6

| | Outer layers | | | Substrate Layers | | |
|---|---|---|---|---|---|---|
| Film | Erucamide | Oleamide | Zinc Stearate | Erucamide | Oleamide | Zinc Stearate |
| Ex. 19 | 0 | 0 | 2000 | 5000 | 5000 | 2000 |
| Ex. 20 | 0 | 0 | 2000 | 4100 | 5000 | 2000 |
| Ex. 21 | 0 | 0 | 2000 | 4100 | 5000 | 1000 |
| Ex. 22 | 0 | 0 | 2000 | 5000 | 0 | 1000 |

| Film | Surface Erucamide | Surface Oleamide | Total Surface Amide |
|---|---|---|---|
| Ex. 19 | 3.8 | 3.5 | 7.3 |
| Ex. 20 | 2.6 | 3.4 | 6.0 |
| Ex. 21 | 2.5 | 3.1 | 5.6 |
| Ex. 22 | 2.7 | 0 | 2.7 |

As seen in Table 6, it was found that a late transition metal stearate can act to facilitate wax bloom through and to an outer surface of a polymeric film. The films in Table 6 above were made having no erucamide or oleamide waxes in the outer layers of a 5 layer film. As shown in Table 6, wax could be bloomed to the surface without the initial presence of these waxes in the outer layers.

TABLE 7

| | Outer layers | | | Substrate Layers | | |
|---|---|---|---|---|---|---|
| Film | Erucamide | Oleamide | Glycerol Mono Stearate | Erucamide | Oleamide | Glycerol Mono Stearate |
| Ex. 23 | 3000 | 0 | 0 | 0 | 10000 | 0 |
| Ex. 24 | 3000 | 0 | 0 | 0 | 10000 | 5000 |

| Film | Surface Erucamide | Surface Oleamide | Total Surface Amide |
|---|---|---|---|
| Ex. 23 | 2.3 | 8.6 | 10.9 |
| Ex. 24 | 2.5 | 11.8 | 14.3 |

Another stearate, glycerol monostearate (GMS) was tested as shown above in Table 7, with a lesser amount of erucamide in the outer layers and both oleamide and GMS placed within the substrate layers. This stearate also provided enhanced bloom rate of wax to the outer layers of the film before the film winding processing step.

TABLE 8

| | Outer layers | | | Substrate Layers | | |
|---|---|---|---|---|---|---|
| Film | Erucamide | Oleamide | Zinc Stearate | Erucamide | Oleamide | Zinc Stearate |
| Ex. 25 | 0 | 1000 | 2000 | 10000 | 0 | 0 |
| Ex. 26 | 0 | 1000 | 2000 | 10000 | 0 | 2000 |
| Ex. 27 | 500 | 0 | 1000 | 5000 | 5000 | 1000 |
| Ex. 28 | 2500 | 500 | 0 | 8000 | 8000 | 2000 |

TABLE 8-continued

| Film | Surface Erucamide | Surface Oleamide | Total Surface Amide |
|---|---|---|---|
| Ex. 25 | 5.3 | 0 | 5.3 |
| Ex. 26 | 8.3 | 0 | 8.3 |
| Ex. 27 | 2.3 | 1.9 | 4.2 |
| Ex. 28 | 2.3 | 13.5 | 15.8 |

Additional experimentation was done varying the amount and placement of the zinc stearate within the outer and substrate layers. As seen in Table 8, increasing the zinc stearate level in the substrate layers, or including zinc stearate in both the outer and substrate layers, enhances wax bloom to the surface.

Optimization work was done to arrive at a blend of different levels of waxes in both the outer and substrate layers to achieve high levels of wax on the film's surface, and minimal contamination in the extrusion forming process. The results are shown in Table 9.

TABLE 9

| | Outer layers | | | Substrate Layers | | |
|---|---|---|---|---|---|---|
| Film | Erucamide | Oleamide | Zinc Stearate | Erucamide | Oleamide | Zinc Stearate |
| Ex. 29 | 2500 | 500 | 2000 | 8000 | 8000 | 2000 |
| Ex. 30 | 2700 | 500 | 2100 | 9200 | 9200 | 2300 |
| Ex. 31 | 3300 | 700 | 2600 | 9200 | 9200 | 2300 |
| Ex. 32 | 2500 | 500 | 2000 | 8000 | 8000 | 2000 |

| Film | Surface Erucamide | Surface Oleamide | Total Surface Amide |
|---|---|---|---|
| Ex. 29 | 8.6 | 6.8 | 15.4 |
| Ex. 30 | 5.2 | 4.8 | 10.0 |
| Ex. 31 | 5.4 | 4.8 | 10.2 |
| Ex. 32 | 8.2 | 6.5 | 14.7 |

In the five layer examples shown above, for Tables 5 through 9, each of the two outer layers and the two substrate layers had the indicated amounts of waxes and/or stearates.

It was found that films of the invention having total amide wax levels of 10 to 15 μg/in$^2$ resulted in substantially consistent film performance from the top to the bottom of the roll. Openability, where a folded film separates well on opening bars of packaging equipment, was excellent, and film tracking through packaging equipment, without excessive wax buildup on the packaging equipment, was also substantially consistent throughout film rolls.

In additional embodiments of the invention, the "core layer" of the film as described herein can actually comprise two, three, five, or more layers.

Thus, a core layer of a film of the invention can comprise an oxygen barrier layer, e.g. comprising ethylene/vinyl alcohol copolymer (EVOH), flanked on each side with an adhesive layer (sometimes referred to as a "tie" layer), such as a polymeric adhesive such as an anhydride grafted polyolefin. This arrangement would effectively comprise a three layer "core":

tie/oxygen barrier/tie

Alternatively, a core layer of a film of the invention can comprise an oxygen barrier layer, e.g. comprising ethylene/vinyl alcohol copolymer (EVOH), flanked on each side with a polyamide (including a copolyamide), and an adhesive layer, such as a polymeric adhesive such as an anhydride grafted polyolefin, on the side of each polyamide layer opposite the oxygen barrier layer. This arrangement would effectively comprise a five layer "core":

tie/polyamide/oxygen barrier/polyamide/tie

Examples of such structures are shown in Tables 10 through 13.

TABLE 10

Example 33

| Layer | Component | Range (ppm) |
|---|---|---|
| 1 (outer$_1$) | Amidic wax | 0-2000 |
| 2 (substrate$_1$) | Amidic wax | 4000-10000 |
| 3 (tie$_1$) | "CORE" | |
| 4 (oxygen barrier) | | |
| 5 (tie$_2$) | | |
| 6 (substrate$_2$) | Amidic wax | 4000-10000 |
| 7 (outer$_2$) | Amidic wax | 0-2000 |

Notes for Table 10:
1. The balance of each of the outer and substrate layers is a polyolefin or ethylene/alpha olefin copolymer. The oxygen barrier and tie layers form 100% of the relevant layer, excluding appropriate additives, but can be blended with other polymers.

Example 34 is like Example 33, but includes zinc stearate in some or all of the outer and substrate layers. The structure of Example 34 is shown in Table 11.

TABLE 11

Example 34

| Layer | Component 1 | Range (ppm) | Component 2 | Range (ppm) |
|---|---|---|---|---|
| 1 (outer$_1$) | Amidic wax | 0-2000 | Zinc stearate | 0-2000 |
| 2 (substrate$_1$) | Amidic wax | 4000-10000 | Zinc stearate | 0-2000 |
| 3 (tie$_1$) | "CORE" | | | |
| 4 (oxygen barrier) | | | | |
| 5 (tie$_2$) | | | | |
| 6 (substrate$_2$) | Amidic wax | 4000-10000 | Zinc stearate | 0-2000 |
| 7 (outer$_2$) | Amidic wax | 0-2000 | Zinc stearate | 0-2000 |

TABLE 12

Example 35

| Layer | Component | Range (ppm) |
|---|---|---|
| 1 (outer$_1$) | Amidic wax | 0-2000 |
| 2 (substrate$_1$) | Amidic wax | 4000-10000 |
| 3 (tie$_1$) | "CORE" | |
| 4 (polyamide$_1$) | | |
| 5 (oxygen barrier) | | |
| 6 (polyamide$_2$) | | |
| 7 (tie$_2$) | | |
| 8 (substrate$_2$) | Amidic wax | 4000-10000 |
| 9 (outer$_2$) | Amidic wax | 0-2000 |

Notes for Table 12:
1. The balance of each of the outer and substrate layers is a polyolefin or ethylene/alpha olefin copolymer. The oxygen barrier, polyamide, and tie layers form 100% of the relevant layer, excluding appropriate additives, but can be blended with other polymers.

Example 36 is like Example 35, but includes zinc stearate in some or all of the outer and substrate layers. The structure of Example 36 is shown in Table 13.

TABLE 13

Example 36

| Layer | Component 1 | Range (ppm) | Component 2 | Range (ppm) |
|---|---|---|---|---|
| 1 (outer$_1$) | Amidic wax | 0-2000 | Zinc stearate | 0-2000 |
| 2 (substrate$_1$) | Amidic wax | 4000-10000 | Zinc stearate | 0-2000 |
| 3 (tie$_1$) "CORE" | | | | |
| 4 (polyamide$_1$) | | | | |
| 5 (oxygen barrier) | | | | |
| 6 (polyamide$_2$) | | | | |
| 7 (tie$_2$) | | | | |
| 8 (substrate$_2$) | Amidic wax | 4000-10000 | Zinc stearate | 0-2000 |
| 9 (outer$_2$) | Amidic wax | 0-2000 | Zinc stearate | 0-2000 |

Films of the invention have first and second outer layers each having an outside surface coating of 3 to 15 micrograms/inch$^2$, such as 4 to 15 micrograms/inch$^2$, 5 to 12 micrograms/inch$^2$, or 6 to 10 micrograms/inch$^2$ of amidic wax. The film has first and second outer layers each having an outside surface coating of more than 3 micrograms/inch$^2$, such as more than 4, 5, 6, 7, or 8 micrograms/inch$^2$ of amidic wax.

In one embodiment of the invention, the film comprises a core layer comprising ethylene/alpha olefin copolymer having a density of 0.910 g/cm$^3$ to 0.922 g/cm$^3$.

In another embodiment of the invention, the film comprises a core layer comprising homogeneous ethylene/C$_{6-8}$ alpha olefin.

In another embodiment of the invention, the film comprises a core layer comprising heterogeneous ethylene ethylene/C$_{6-8}$ alpha olefin.

In another embodiment of the invention, the film comprises a core layer comprising a blend of heterogeneous and homogeneous ethylene ethylene/C$_{6-8}$ alpha olefin.

In another embodiment of the invention, the film comprises a core layer comprising an interpenetrating network polymer.

In another embodiment of the invention, the film comprises a core layer comprising an ethylene/styrene interpolymer.

In another embodiment of the invention, the film comprises a core layer comprising a norbornene/ethylene copolymer as in the film structure of U.S. patent application Ser. No. 60/401066 entitled "High Free Shrink, High Modulus, Low Shrink Tension Film With Elastic Recovery" filed on Aug. 5, 2002, incorporated herein by reference in its entirety.

In another embodiment of the invention, the film comprises a core layer comprising a propylene homopolymer or copolymer.

In another embodiment of the invention, the film comprises a core layer comprising an ethylene/vinyl acetate copolymer.

In another embodiment of the invention, the film comprises a core layer comprising a polystyrene.

TABLE 14

Typical three layer film structures with components

| Layer 1 Outer 10-30% | | Layer 2 Substrate 40-80% | | Layer 3 Outer 10-30% | |
|---|---|---|---|---|---|
| Component | Range ppm | Component | Range ppm | Component | Range Ppm |
| KEMAMIDE VO ™ Oleamide | 0-2000 | KEMAMIDE VO ™ Oleamide | 4000-10000 | KEMAMIDE VO ™ Oleamide | 0-2000 |
| KEMAMIDE E ™ Erucamide | 0-2500 | KEMAMIDE E ™ Erucamide | 4000-10000 | KEMAMIDE E ™ Erucamide | 0-2500 |
| KEMAMIDE W-20 ™ Ethylene bis-oleamide | 0-3000 | KEMAMIDE W-40 ™ Ethylene bis-stearamide | 1000-7000 | KEMAMIDE W-20 ™ Ethylene bis-oleamide | 0-3000 |
| KEMAMIDE W-40 ™ Ethylene bis-stearamide | 1000-7000 | Zinc Stearate | 0-2000 | KEMAMIDE W-40 ™ Ethylene bis-stearamide | 1000-7000 |
| Zinc Stearate | 0-2000 | | | Zinc Stearate | 0-2000 |
| 3M W210 ZEEO-SPHERES ™ aluminosilicate | 0-3000 | | | 3M W210 ZEEO-SPHERES ™ aluminosilicate | 0-3000 |
| Grace Davison SYLOBLOC ™ M150 Silica and oleamide | 0-3000 | | | Grace Davison SYLOBLOC ™ M150 Silica and oleamide | 0-3000 |

TABLE 14-continued

Typical three layer film structures with components

| Layer 1 Outer 10-30% | | Layer 2 Substrate 40-80% | | Layer 3 Outer 10-30% | |
|---|---|---|---|---|---|
| Component | Range ppm | Component | Range ppm | Component | Range Ppm |
| Grace Davison SYLOBLOC ™ M250 Silica and erucamide | 0-3000 | | | Grace Davison SYLOBLOC ™ M250 Silica and erucamide | 0-3000 |

Notes for Table 14:
1. The gauge of these films can be e.g. from 0.4 to 1.25 mil.
2. Thickness of each layer, as a percentage of total film thickness, is shown in the second row of the table.
3. The outer two layers can be symmetrical or independent in composition, i.e. first outer layer 1 and second outer layer 3 can differ in composition.
4. In each of layers 1 through 3, the layer comprises any suitable polymer, such as one of the host polymers disclosed herein. The amidic wax and antiblock components indicated in Table 14 are added to the respective host polymer via masterbatch or other suitable means well known in the art, generally prior to extrusion or coextrusion of the respective layers by any conventional extrusion process.

Although film examples disclosed herein have a thickness typically from 0.4 to 1.25 mils, those skilled in the art will appreciate that films of other thicknesses can be made by conventional processes. Such thicknesses include 0.5 to 15 mils, such as 1 to 10 mils, 3 to 7 mils, and 4 to 6 mils. Thickness can be chosen dependent on a variety of factors, including choice of processing equipment, intended end use, choice of host polymer for each layer, total number of film layers, etc. Likewise, the percent of the film represented by each layer, in terms of thickness % of each layer, or weight % (by weight of the total film weight) of each layer of the film can vary.

Asymmetric embodiments

Although film examples disclosed herein typically have a symmetric or palindromic structure, e.g.

A/B/A or

A/B/C/B/A where the "A" layers are identical in all respects; and the "B" layers are identical in all respects, films with compositional or structural asymmetry can also be made with benefit in connection with the present invention.

Thus, e.g. films in accordance with the invention can have the construction:

A/B/D or

A/B/C/E/D where the "A" and "D" layers, and/or the "B" and "E" layers, differ from one another with respect to any of:
composition or quantity of the host polymer;
composition or quantity of the amidic wax;
composition or quantity of the stearate;
composition or quantity of antiblock agent; and
layer thickness.

One particular film embodiment that can be useful in certain end use applications, is the incorporation of an amidic wax, or a blend of amidic wax and stearate, in one outer layer and/or substrate layer, but not in the second outer layer or second substrate layer of that film. This embodiment can be useful where a second outer layer of the film, representing one surface of the film, is to be laminated, after production of the film, to a second film, web, etc. where the presence of amidic wax in the second outer layer would hinder proper adhesion of the film to the second film. Such wax could undesirably hinder the lamination process or strength of the film to film bond, or in some other way affect the performance of the laminate. The wax that blooms to the surface could be originally in the second outer layer, or could migrate from the second substrate layer (if present).

Examples of asymmetric films of the invention can be seen in the following graphic:

A/B/D//$2^{nd}$ film where the outer surface of second outer layer "D" is adhered by any suitable means to the $2^{nd}$ film. For this embodiment, no or substantially no amidic wax, or wax/stearate blend, is present in layer "D".

Likewise, in a five layer example:

A/B/C/E/D//$2^{nd}$ film where the outer surface of second outer layer "D" is adhered by any suitable means to the $2^{nd}$ film. For this embodiment, no or substantially no amidic wax, or wax/stearate blend, is present in either second outer layer "D", or layer "E".

The invention is not limited to the illustrations described herein, which are deemed to be merely illustrative, and susceptible of modification of form, size, arrangement of parts and details of operation.

Any numerical values recited herein include all values from the lower value to the upper value in increments of one unit provided that there is a separation of at least 2 units between any lower value and any higher value. As an example, if it is stated that the amount of a component, or a value of a process variable such as, for example, temperature, pressure, time and the like is, for example, from 1 to 90, such as 20 to 80, such as 30 to 70, it is intended that values such as 15 to 85, 22 to 68, 43 to 51, 30 to 32 and the like, are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

What is claimed is:

1. A multilayer film comprising:
   a) a first and second outer layer each comprising a polymer;
   b) a core layer comprising a polymer; and
   c) a first and second substrate layer each comprising a polymer, the first and second substrate layers disposed between the core layer and the first and second outer layers respectively;
   wherein each of
   i) the first substrate layer,
   ii) the second substrate layer,
   iii) the first outer layer, and
   iv) the second outer layer,
   comprises primary fatty amidic wax;
   wherein the first outer layer comprises primary fatty amidic wax in an amount of 15% to 50% of the amount of primary fatty amidic wax in the first substrate layer; and the second outer layer comprises primary fatty amidic wax in an amount of 15% to 50% of the amount of primary fatty amidic wax in the second substrate layer;
   wherein at least one of
   i) the first and second outer layers, and
   ii) the first and second substrate layers
   comprises from 1,000 ppm to 5,000 ppm of a transition metal salt of stearic acid, or ester of stearic acid; and
   wherein the first and second substrate layers each comprises from 4,000 ppm to 10,000 ppm of oleamide.

2. The film of claim 1 wherein the first and outer layers, the core layer, and the first and second substrate layers, each comprises a polymer selected from the group consisting of:
   a) ethylene/alpha olefin copolymer;
   b) ethylene/vinyl acetate copolymer;
   c) ionomer resin;
   d) ethylene/acrylic or methacrylic acid copolymer;
   e) ethylene/acrylate or methacrylate copolymer; and
   f) low density polyethylene.

3. The film of claim 1 wherein the transition metal salt of stearic acid comprises zinc stearate.

4. The film of claim 1 wherein the first and second outer layers each comprises an antiblock agent.

5. The film of claim 1 wherein the film exhibits an Elmendorf Tear value (ASTM D 1922-94A) of more than 25 grams per mil.

6. The film of claim 1 wherein the film is heat shrinkable.

7. The film of claim 1 wherein the first and second outer layers each comprises from 3,000 ppm to 6,000 ppm of primary fatty amidic wax.

8. A multilayer film comprising:
   a) a first and second outer layer each comprising a polymer; and
   b) a substrate layer comprising a polymer;
   wherein each of
   i) the first outer layer,
   ii) the second outer layer, and
   iii) the substrate layer,
   comprises a primary fatty amidic wax;
   wherein the first outer layer comprises primary fatty amidic wax in an amount of 15% to 50% of the amount of primary fatty amidic wax in the substrate layer; and the second outer layer comprises primary fatty amidic wax in an amount of 15% to 50% of the amount of primary fatty amidic wax in the substrate layer;
   wherein at least one of
   i) the first and second outer layers, and
   ii) the substrate layer
   comprises from 1,000 ppm to 7,000 ppm of a transition metal salt of stearic acid, or ester of stearic acid; and
   wherein the substrate layer comprises from 4,000 ppm to 10,000 ppm of oleamide.

9. The film of claim 8 wherein the first and outer layers, and the substrate layer, each comprises a polymer selected from the group consisting of:
   a) ethylene/alpha olefin copolymer;
   b) ethylene/vinyl acetate copolymer;
   c) ionomer resin;
   d) ethylene/acrylic or methacrylic acid copolymer;
   e) ethylene/acrylate or methacrylate copolymer; and
   f) low density polyethylene.

10. The film of claim 8 wherein the transition metal salt of stearic acid comprises zinc stearate.

11. The film of claim 8 wherein the first and second outer layers each comprises an antiblock agent.

12. The film of claim 8 wherein the film exhibits an Elmendorf Tear value (ASTM D 1922-94A) of more than 25 grams per mil.

13. The film of claim 8 wherein the film is heat shrinkable.

14. The film of claim 1 wherein both the first and second outer layers, and the first and second substrate layers, comprise a transition metal salt of stearic acid, or ester of stearic acid.

15. The film of claim 8 wherein both the first and second outer layers, and the substrate layer, comprise a transition metal salt of stearic acid, or ester of stearic acid.

16. The film of claim 8 wherein the first and second outer layers each comprises from 3,000 ppm to 6,000 ppm of primary fatty amidic wax.

* * * * *